US006982053B2

United States Patent
Chen

(10) Patent No.: US 6,982,053 B2
(45) Date of Patent: *Jan. 3, 2006

(54) METHOD OF MANUFACTURING COMPOSITE WOOD GOLF CLUB HEAD WITH METAL FACE

(76) Inventor: Archer C. C. Chen, No. 501, 28th Road, Taichung Industrial Park, Taichung (TW)

( * ) Notice: Subject to any disclaimer, the term of this patent is extended or adjusted under 35 U.S.C. 154(b) by 307 days.

This patent is subject to a terminal disclaimer.

(21) Appl. No.: 10/268,947

(22) Filed: Oct. 11, 2002

(65) Prior Publication Data

US 2004/0031560 A1    Feb. 19, 2004

(51) Int. Cl.
*B29C 43/02*    (2006.01)
*B29C 43/18*    (2006.01)
(52) U.S. Cl. ............... 264/138; 264/238; 264/275; 264/320
(58) Field of Classification Search ......... 264/245, 264/241, 320, 238, 275, 138
See application file for complete search history.

(56) References Cited

U.S. PATENT DOCUMENTS

| 5,445,382 | A  | * | 8/1995 | Pearce et al. | 473/342 |
|---|---|---|---|---|---|
| 6,406,381 | B2 | * | 6/2002 | Murphy et al. | 473/345 |
| 6,607,623 | B2 | * | 8/2003 | Murphy et al. | 156/156 |
| 6,623,378 | B2 | * | 9/2003 | Beach et al. | 473/345 |
| 2002/0187849 | A1 | * | 12/2002 | Kusumoto et al. | 473/305 |

FOREIGN PATENT DOCUMENTS

JP    64-68284    * 3/1989

* cited by examiner

*Primary Examiner*—Edmund H. Lee
(74) *Attorney, Agent, or Firm*—Browdy and Neimark, PLLC

(57)    ABSTRACT

A method of manufacturing a composite golf club head with a metal face includes the following steps. 1. Arrange two die and a mold plunger. 2. Combine the dies to form a mold cavity, which bottom is installed with a metal bottom board. 3. Put a bulk molding compound (B.M.C.) into the mold cavity. 4. Move the mold plunger into the mold cavity to compress the B.M.C. 5. Solidify the compressed bulk molding compound, and then separate the dies and the mold plunger to get a composite main body of the golf club head. The main body thus obtained has a main casing with a top opening. 6. Mount a composite top casing to the main casing to cover the top opening. Mount a metal front casing to a front side of the main casing to form the face.

10 Claims, 9 Drawing Sheets

METHOD OF MANUFACTURING COMPOSITE WOOD GOLF CLUB HEAD WITH METAL FACE

FIELD OF THE INVENTION

The present invention relates to a golf club, and more particularly to a method of manufacturing a composite golf club head with a metal face.

BACKGROUND OF THE INVENTION

A conventional golf club head, especially to a wood club head, made of composite material, such as carbon composite, has capacities of lighter weight, higher strength and easy formation etc. But, composite material has poor capacity of wear-resisting such that the composite golf club head will easy to be worn at the face, the portion of the golf club head contacts the ball when swinging. Therefore, an ideal golf club head will be made of composite material with a metal face. These golf club heads usually had a problem of weak structure strength at the connecting portion where the metal face is fixed with the composite body of the head. Such metal face usually had its back side, especially on the peripheral of the back side thereof, contacted on the body of the head so that it will reduce the deflection of the metal face when the metal face hits the ball, thus it can hardly drive the ball further.

SUMMARY OF THE INVENTION

The primary objective of the present invention is to provide a method of manufacturing a wood golf club head, which is made of composite material with a metal face.

The secondary objective of the present invention is to provide a method manufacturing a wood golf club head and the golf club head thus obtained has well capacity of spring-like effect.

According to the objectives of the present invention, a method of manufacturing a composite wood golf club head with a metal face includes the following steps.

1. Arrange a first die, a second die and a mold plunger. The first die and the second die can be driven to combine and to separate. The first and second dies respectively have a first and second cavities, each of which has a recessed portion and a slot portion extending inwardly from a topside of the respective die to the recessed portion. The recessed portions and the slot portions of the first and second cavities are combined with each other when the first die and the second die are combined. The mold plunger is located above the dies and can be driven to move downwards and upwards. The mold plunger has a mold portion at the bottom thereof and a plunger portion at the top thereof.

2. Combine the first die and the second die such that a mold cavity is defined by the first and second cavities. The mold cavity has a convex wall at a side wall thereof substantially corresponding in shape to the face of the golf club head to be made, and an annular flange around the convex wall. The bottom side of the mold cavity is premounted with a metal bottom board.

3. Put a bulk molding compound (B.M.C.) into the mold cavity.

4. Move the mold plunger into the mold cavity through the slot portions to compress the B.M.C. until the slot portions are sealed by the plunger portion of the mold plunger such that a mold space, including a platelike portion left between the convex wall and the mold portion of the mold plunger, is defined in between the recessed portions of said first and second cavities and the mold portion of said mold plunger for being filled with the bulk molding compound. The compressed B.M.C. covers the metal bottom board.

5. Solidify the compressed bulk molding compound, and then separate the first die, the second die and the mold plunger to get a composite main body of the golf club head. The main body thus obtained has a main casing, which has a front wall corresponding in shape to the platelike portion of the mold space, an annular recess corresponding in shape to said annular flange and a top opening at a top side thereof. The bottom board is embedded in a bottom of the main casing and exposes its exterior surface outside.

6. Fix a front casing and a top casing to said main casing. The top casing is fixed to the main casing to cover the top opening. The front casing, which is made of metal, has a board portion and an annular wall extending backwards from the periphery of the board portion and provided with an engaging portion at the distal end thereof for engagement with said annular recess of said main casing.

DETAILED DESCRIPTION OF THE INVENTION

Figure 1:
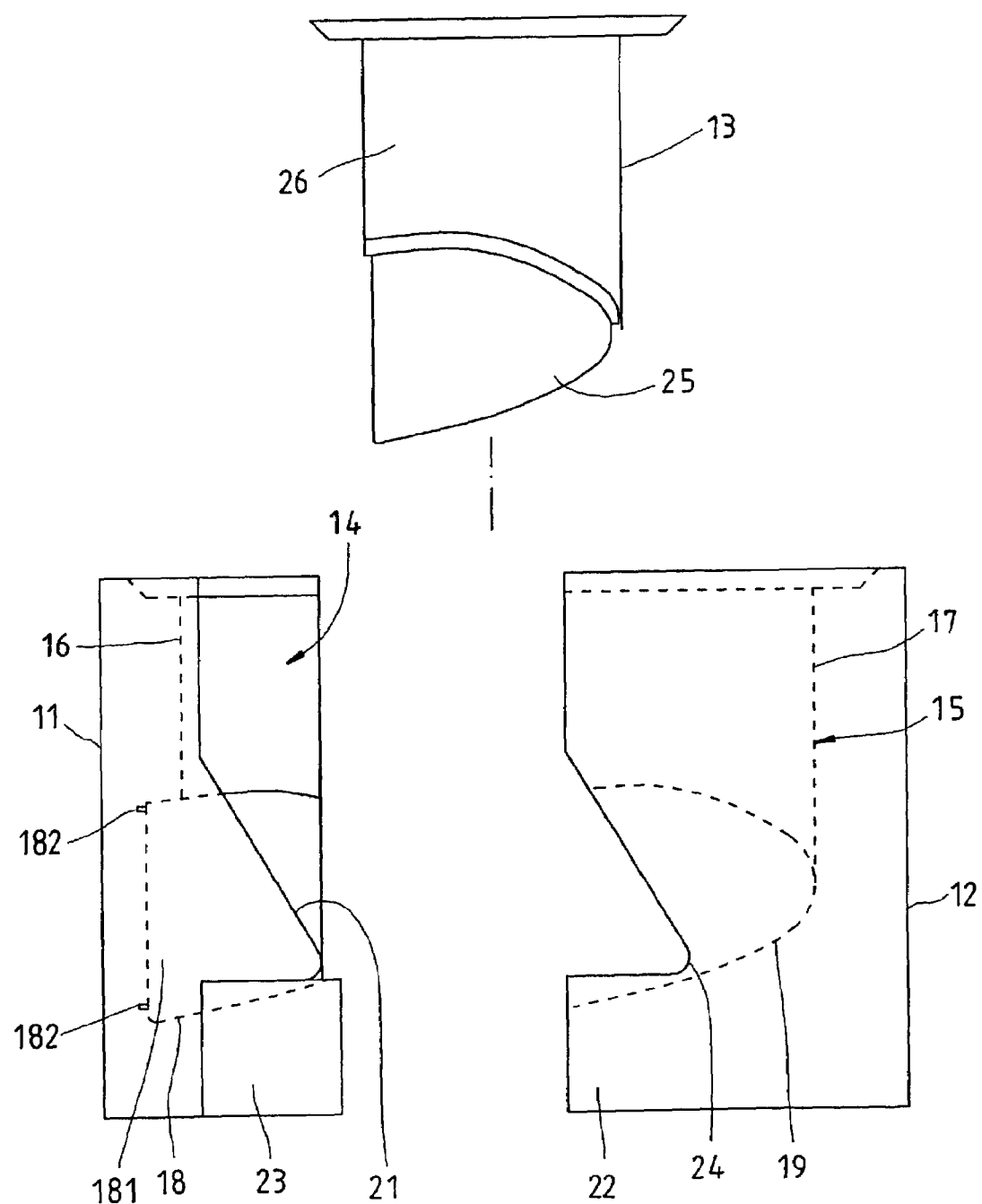
FIG. 1 is a schematic view of a first step of a method of a preferred embodiment of the present invention.
Figure 2:
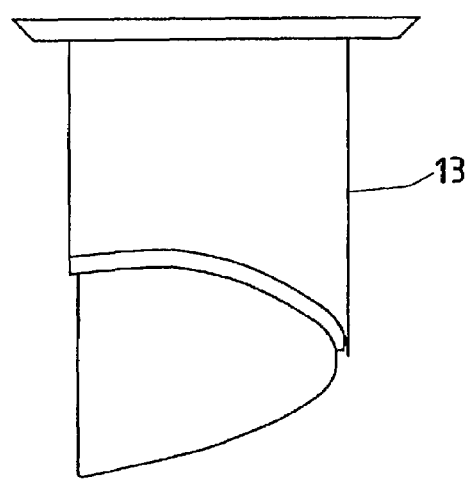
FIG. 2 is a schematic view of a second step of the method of the first preferred embodiment of the present invention.
Figure 2:
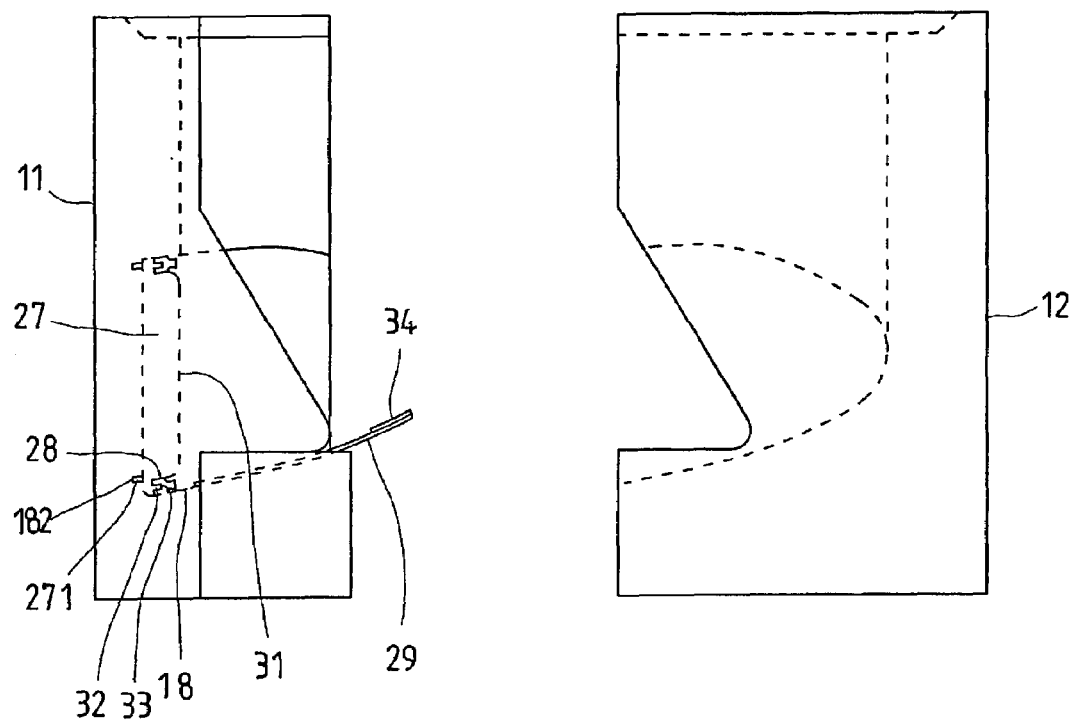

Please refer to FIGS. from FIG. 1 to FIG. 7, the first preferred embodiment of the present invention provides a method of manufacturing a golf club head comprising the following steps.

Step 1: Please refer to FIG. 1, arrange a first die 11, a second die 12 and a mold plunger 13. The first and the second dies 11 and 12 are arranged at same level, which are driven by hydraulic, pneumatic or mechanical driving machine for movement toward or away from each other. The first and the second dies 11 and 12 will be combined after they are driven to move towards.

The first die 11 has a first cavity 14 at the side thereof facing the second die 12 and the second die has a second cavity 15 at the side thereof facing the first die 11. The first and the second cavities 14 and 15 have recessed portions 18 and 19 and slot portions 16 and 17 extended from the top sides of the first and the second dies 11 and 12 to the recessed portions 18 and 19 respectively. The recessed portion 18 of the first dies 11 has a core socket 181 and two locating holes 182 at the bottom side thereof. The first and the second dies 11 and 12 respectively have plug portions 21 and 22 and socket portions 23 and 24 at the interior sides thereof. The plug portions 21 and 22 are engaged with socket portions 23 and 24 when the dies II and 12 are combined.

The mold plunger 13 is arranged above the dies 11 and 12 and can be driven to move upwards and downwards. The mold plunger 13 has a mold portion 25 at bottom side thereof and a plunger portion 26 at topside thereof.

Step 2: Please refer to FIG. 2, arrange a movable core 27, an annular frame 28 and a bottom board 29 into the recessed portion 18 of the first die 11. The movable core 27 is inserted into the core socket 181 of the recessed portion 18 with two plugs 271 engaged with the locating holes 182 respectively, therefore the core 27 is detachably mounted in the recessed portion 18 of the first die 11. The core 27 has a convex wall 31 at exterior side thereof having a shape corresponding to the face of a golf club head to be made, and an annular flange 32 around the convex wall 31. The annular frame 28 is a metal element having a shape corresponding to the annular flange 32. The annular frame 28 has an annular recess 33 for engagement with the annular flange 32, therefore the annular frame is detachably mounted on the convex 31 of the core 27. The bottom board 29 is also made of metal, having a part thereof inlaid on the bottom surface of the recessed portion 18 and the other part projected out of the recessed portion 18. The bottom board 29 is provided with a weight device 34 on the projected side thereof.

Step 3: Please refer to FIG. 3, drive the dies 11 and 12 moving towards for the cavities 14 and 15 combined to form a mold cavity 35 such that the bottom board 29 rests on the bottom side of the mold cavity 35.

Step 4: Please refer to FIG. 4, put a bulk molding compound (B.M.C.) 36 into the mold cavity 35 of the dies 11 and 12. The B.M.C. can be carbon fiber, glass fiber or Kevlar fiber composite material.

Step 5: Please refer to FIG. 5, drive the mold plunger 13 moving downward into the mold cavity 35 of the dies 11 and 12 via the slot portions 16 and 17 to make the mold portion 25 compress the B.M.C. 36 under a predetermined pressure, in the mean time, the plunger portion 26 will fill the slot portions 16 and 17, such that a mold space 37 is defined by the mold portion 25 of the mold plunger 13, the recessed portions 18, 19, core 27, annular frame 28 and the bottom board 28. The mold space 37 includes a platelike portion 38 left in between the convex 31 of the core 27 and the mold portion 25 of the mold plunger 13. The B.M.C. 36 fills the mold space 37 and covers the bottom board 29, the weight device 34 and the annular frame 28.

Step 6: Please refer to FIG. 6, after the B.M.C. 36 solidified, remove the mold plunger 13 and then separate the dies 11 and 12 to get a composite main body 39 having a shape related to the mold space 37. The main body 39 has a main casing 41 and a neck (not shown) at a side of the main casing 41. The main casing 41 has a front wall 42 and a bottom wall 43, wherein the front wall 42 is formed in the platelike portion 38 of the mold space 37 with a thickness between 0.5 mm and 3 mm. The main casing 41 further has a top opening 44 at top side thereof and an annular slot 45 at the peripheral of the top opening 44.

Figure 6:
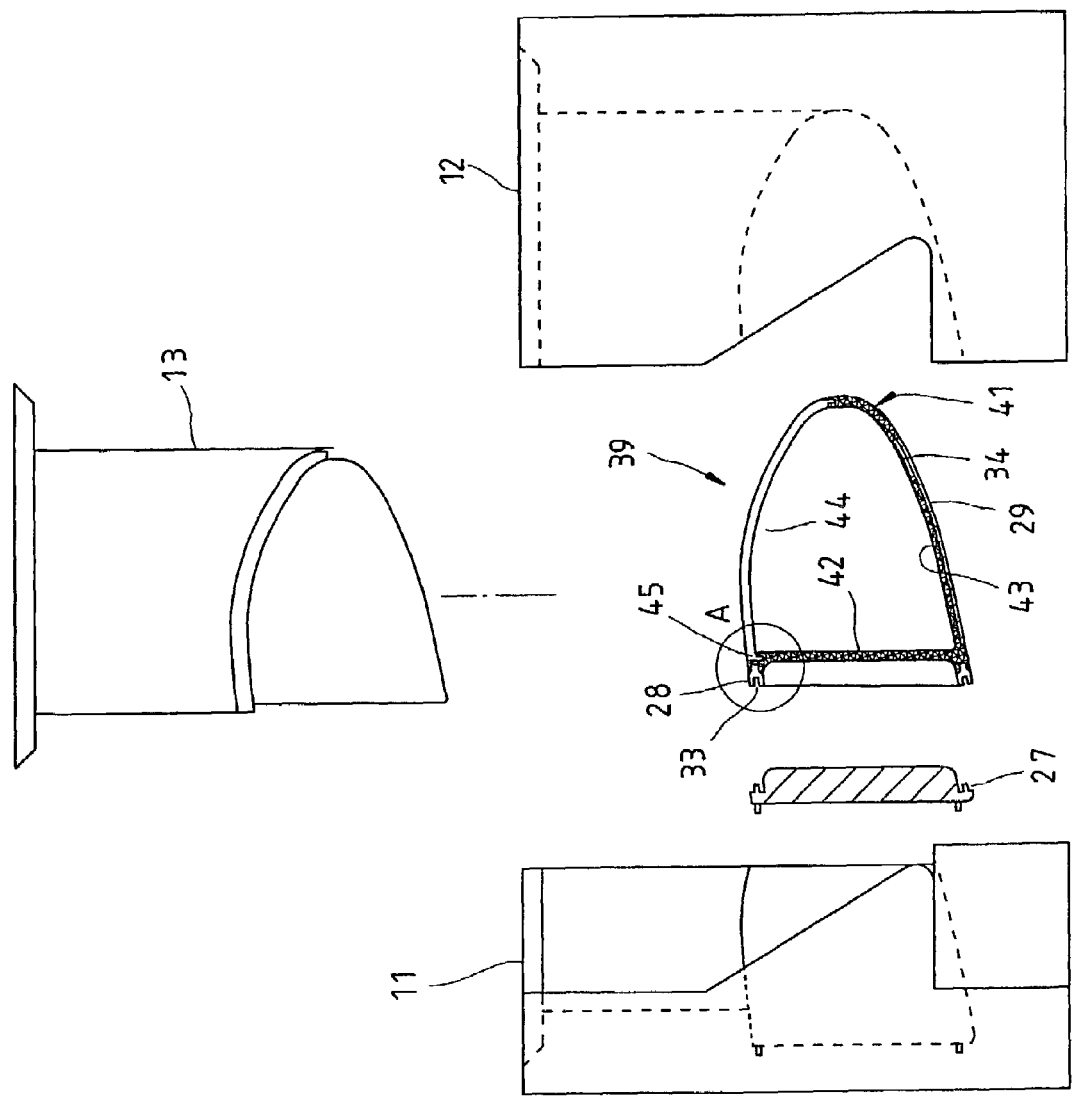
FIG. 6 is a schematic view of a sixth step of the method of the first preferred embodiment of the present invention.
Figure 6A:
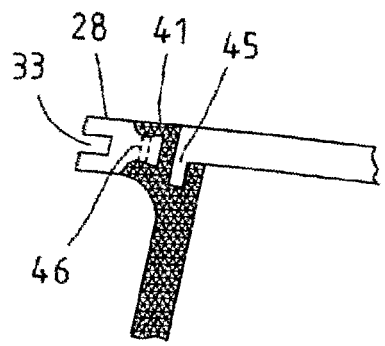
FIG. 6A is an enlarged view in part A of FIG. 6.
Figure 6B:
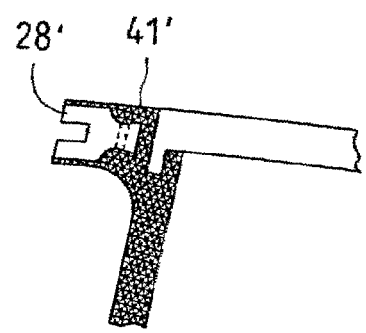
FIG. 6B is an enlarged view, showing an alternate structure of the connecting portion of the main body and the annular frame.

The metal bottom board 29 and the weight device 34 is embedded in the bottom wall 43 of the main casing 41 and the exterior surface of the bottom board 29 is exposed at same level of the bottom surface of the main casing. The metal annular frame 28 is embedded in the front wall 42 of the main casing and its exterior surface of the front portion thereof is exposed outside as shown in FIG. 6A. However, as shown in FIG. 6B, the exterior surface of the front portion of the annular frame 28' can be totally encased in the front wall 42'. The annular recess 33 of the annular frame 28 is exposed outside the front wall 42 of the main casing 41. The bottom board 29 and the annular frame 28 are fixed with the main body 39 by means of the adhesive of the composite material itself. The bottom board 29 has a bevel edge, which means the bottom board 29 has larger dimension at the interior side and smaller dimension at exterior side, to make it can not loose from the main casing 41. The annular frame 28 has a post at inner side thereof, which has larger dimension at the distal end and smaller dimension at proximal end, and holes 46 at the post to be filled with the composite material therein, please refer to FIG. 6A, to make it can not loose from the main casing 41.

Step 7: Please refer to FIG. 7, fix a top casing 47 and a front casing 48 to the main body 39 to form a wood golf club head 60.

Figure 7:
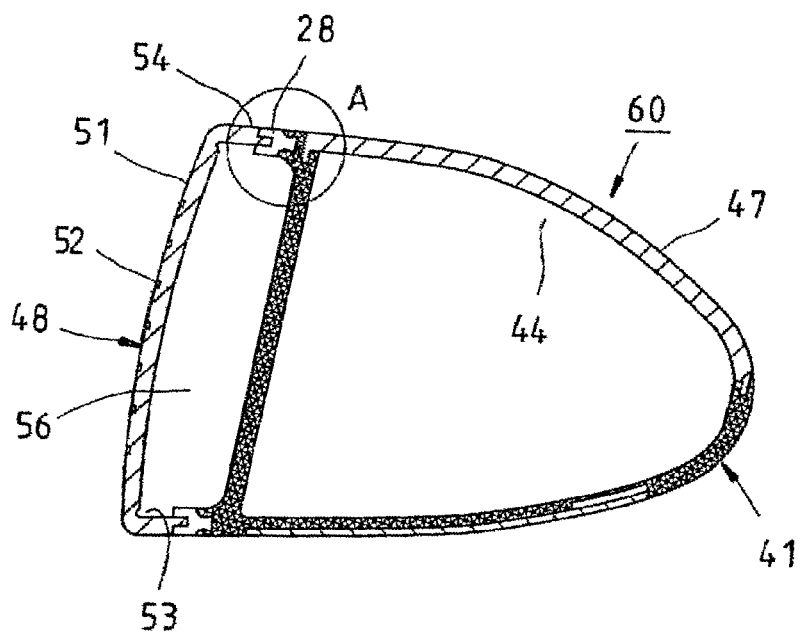
FIG. 7 is a schematic view of a seventh step of the method of the first preferred embodiment of the present invention.
Figure 7A:
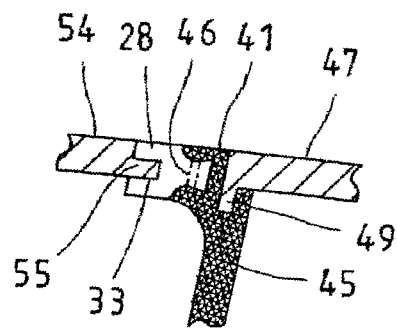
FIG. 7A is an enlarged view in part A of FIG. 7.

The top casing 47 is made from composite, plastics or metal etc. and its shape relates to the top opening 44 of the main casing 41. The top casing 47 has an annular flange 49 engaged with the annular slot 45 at the peripheral of the top opening 44, please refer to FIG. 7A, and glue, e.g. epoxy resin, is added to fix the top casing 47 with the main casing 41.

The front casing 48 is made of metal, such as stainless, Maraging steel, titanium or titanium alloy etc. and is made from forging or pressing. The front casing 48 has a board portion 51 with its periphery corresponding to the shape of the annular frame 28, transverse dents 52 at exterior surface of the board portion 51, and annular recess 53 at peripheral portion of the back side thereof. The front casing 48 has an annular wall 54 extended backwards from the periphery of the board portion 51. The extended length of the annular wall 54 is between 3 mm and 40 mm. The annular wall 54 has an engaging portion 55 at the distal end thereof. The front casing 48 engages its engaging portion 55 to the annular recess 33 of the annular frame 28 and fix with it by means of welding or glue etc., such that the front casing 48 is fixedly mounted on the front side of the main casing 41.

It has to be mentioned here, the neck is integrally formed on the main casing 41 at initial in the present preferred embodiment, it also can be formed on the top casing 47 or front casing 48. The neck also can be made of an independent element to be mounted on a proper position of the main body.

The wood golf club head 60 made from the processes as described above has a composite part, including the main casing 41 and top casing 47, and a metal part, the front casing 48. The composite part has the capacity of higher strength and lighter weight and the metal part has the capacity of higher wear-resisting.

The front casing 48 has the annular wall 54 fixed to the main casing 41, such that a back space 56 is formed between the board portion 51 and the main casing 41 (the conventional golf club head attached its face directly to the main casing so that there is no space left between the face and the main casing) and the board portion 51 has the annular recess 53 at back side thereof, therefore the board portion 51 will have superior capacity of elasticity, i.e., the board portion 51 will have well spring-like effect (it also called "trampoline effect") to elongate the time of the board portion 51 contacting the ball when swinging. Thus, the wood golf club head 60 of the present invention has a well capacity of controlling ball.

The golf club head 60 is provided with the metal bottom board 29 at the bottom side thereof to be contacted with the ground when swinging. Manufacturer also can mark textures or icons on the bottom board 29. The metal bottom board 29 also can work like the weight device 34 to shift the center of gravity of the golf club head 60 to the bottom side thereof. The weight device 34 can shift the center of gravity to the rear side.

The composite main body 39 is provided with the metal annular frame 28 at the front side of the main casing 41. The metal annular frame 28 can absorb the impact occurred on board portion 51 of the front casing 48 when swinging, except that, the front casing 48 can be welded to the annular frame 28 fixedly because of both of them are metal.

In step 2, the annular frame 28 is installed on the core 27, and then put them into the recessed portion 18 of the die 11. The advantage of the step 2 is that manufacturer can replace the core 27 with different size such that the dimension of the main body 39 will be changed according to the size of the core 27. In other words, the present invention also can provide the recessed portion 18 of the die 11 having a shape like the core 27 and installs the annular frame 28 thereto.

Figure 8:
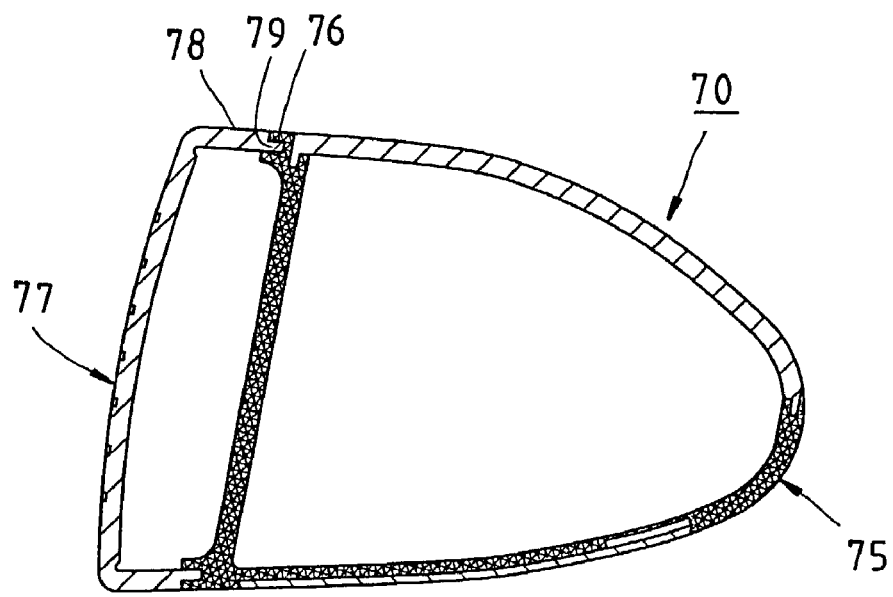
FIG. 8 is a sectional view of a golf club head made from a method of a second preferred embodiment of the present invention.
Figure 10:
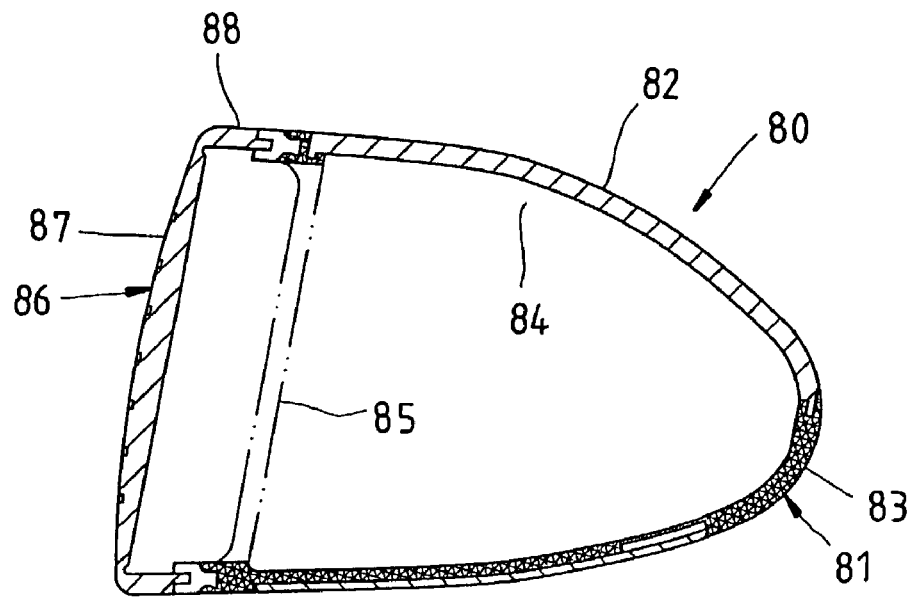
Figure 9:
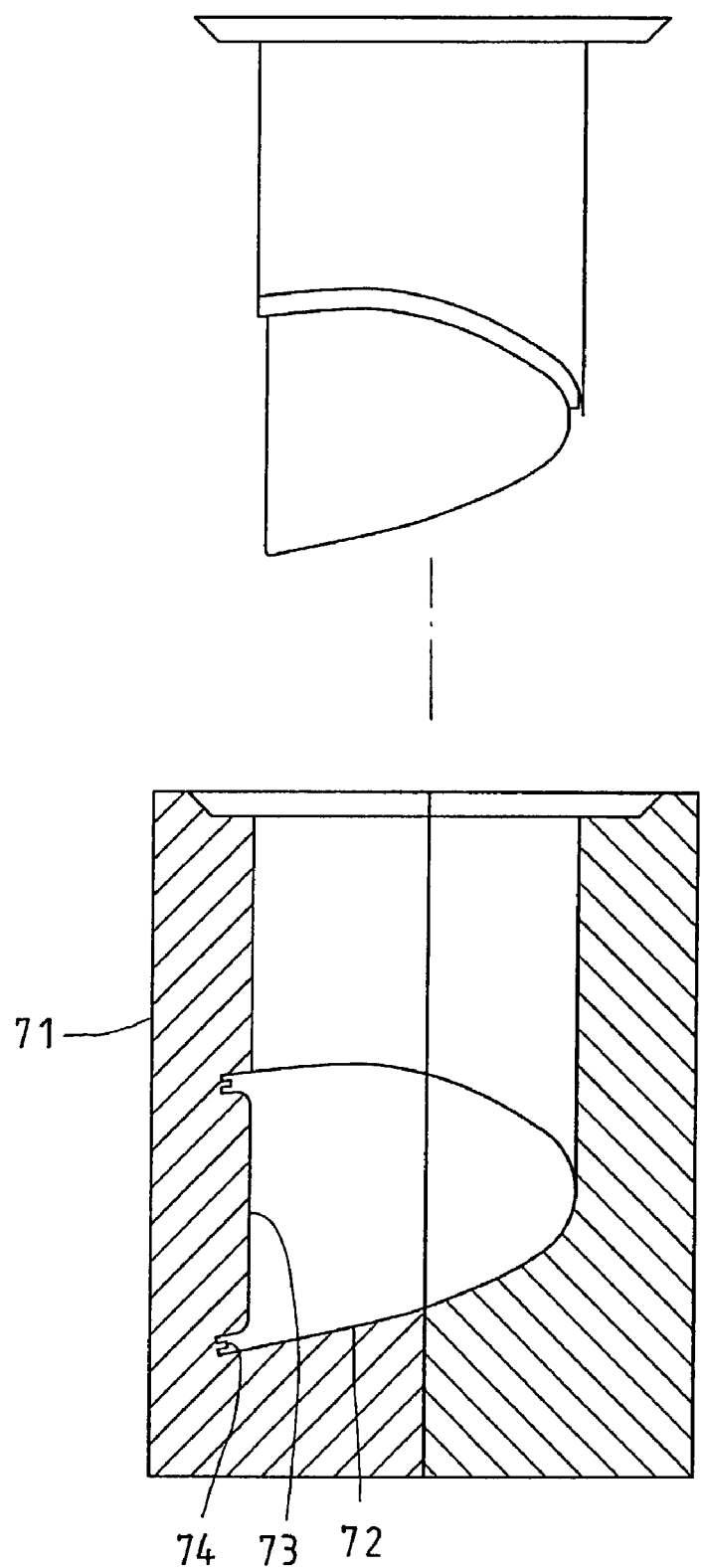
FIG. 9 is a schematic view of dies used in the method of the second preferred embodiment of the present invention, and FIG. 10 a sectional view of a golf club head made from a method of a third preferred embodiment of the present invention.

FIG. 8 shows a wood golf club 70 head made from a method of the second preferred embodiment. The wood golf club 70 head has no metal annular frame. FIG. 9 shows dies to mold the wood golf club head 70, which comprises a first die 71 having a recessed portion 72, a convex wall 73 at the side wall of the recessed portion 72 and an annular flange 74 around the convex wall 73. The golf club head has a main casing 75 with an annular recess 76 corresponding to the annular flange 74. A front casing 77, same as the front casing 48 of the first preferred embodiment, fixes its annular wall 78 to the main casing 75. As same as the first preferred embodiment, the annular wall has an engaging portion 79 at the distal end thereof and the main casing 75 has the annular recess 76 for engagement of the engaging portion 79. Glue is added between the main casing 75 and the front casing 77 to fix them together. Thus, the golf club head 70 has a composite main body and a metal face.

Figure 3:
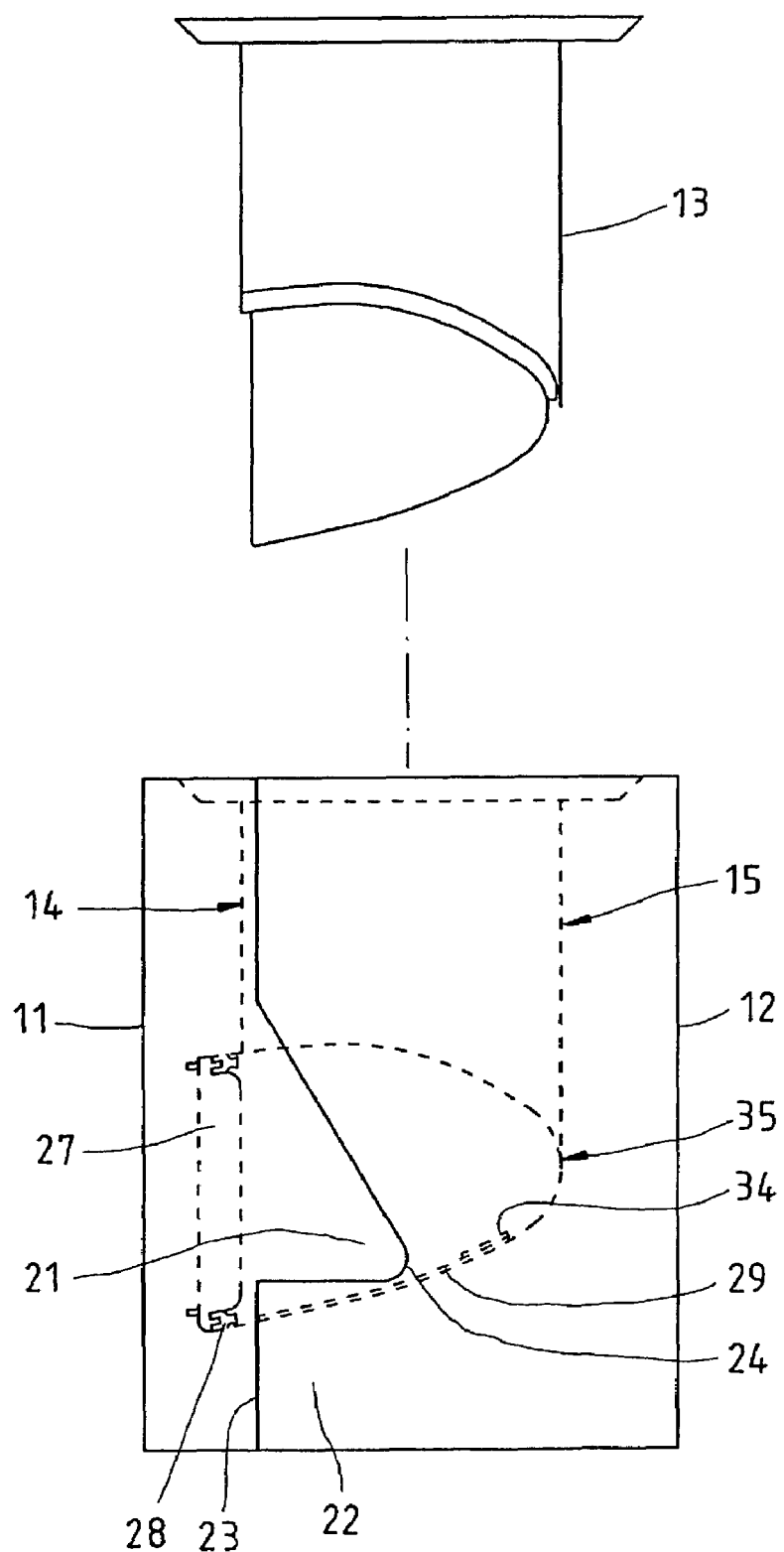
FIG. 3 is a schematic view of a third step of the method of the first preferred embodiment of the present invention.
Figure 4:
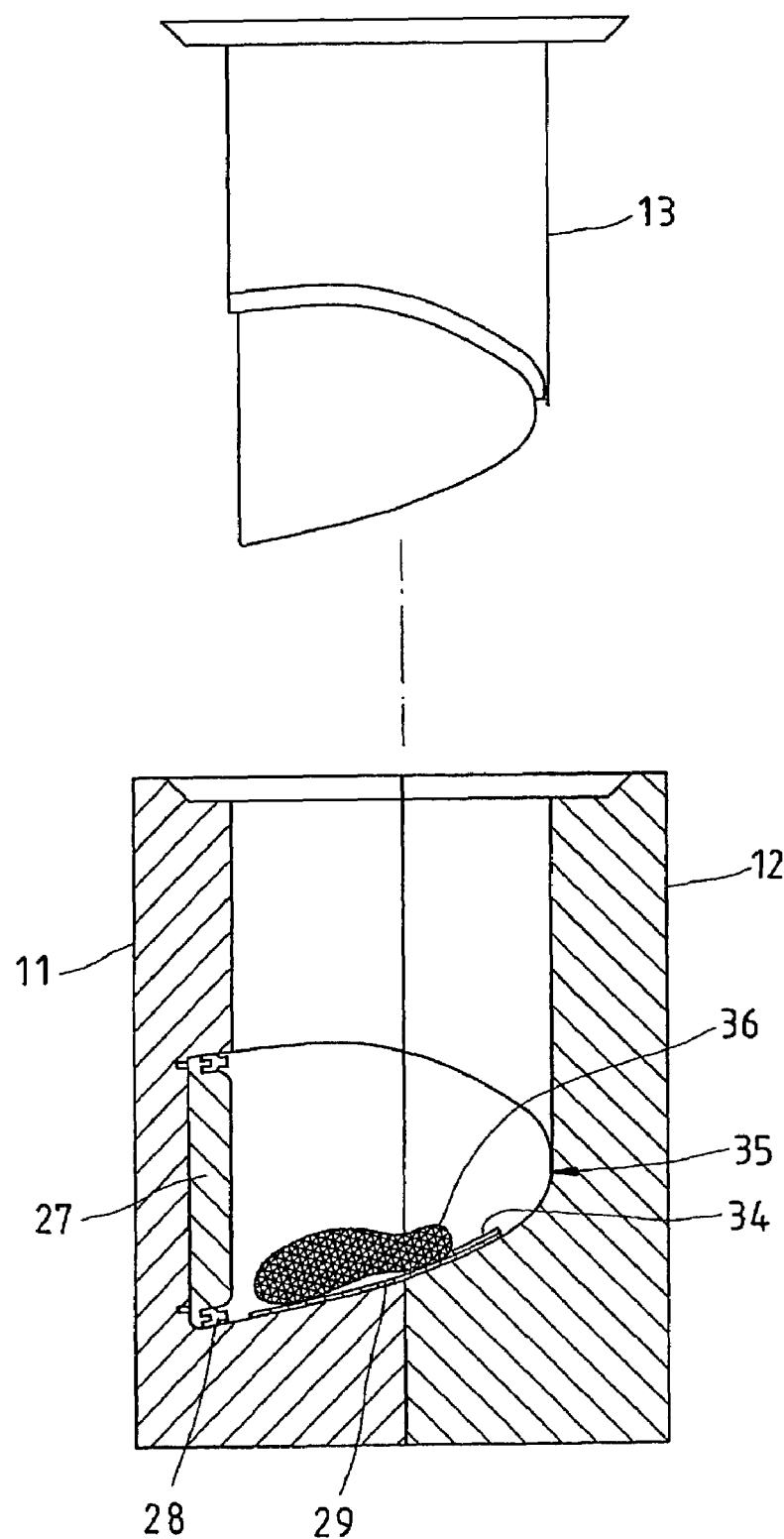
FIG. 4 is a schematic view of a fourth step of the method of the first preferred embodiment of the present invention.
Figure 5:
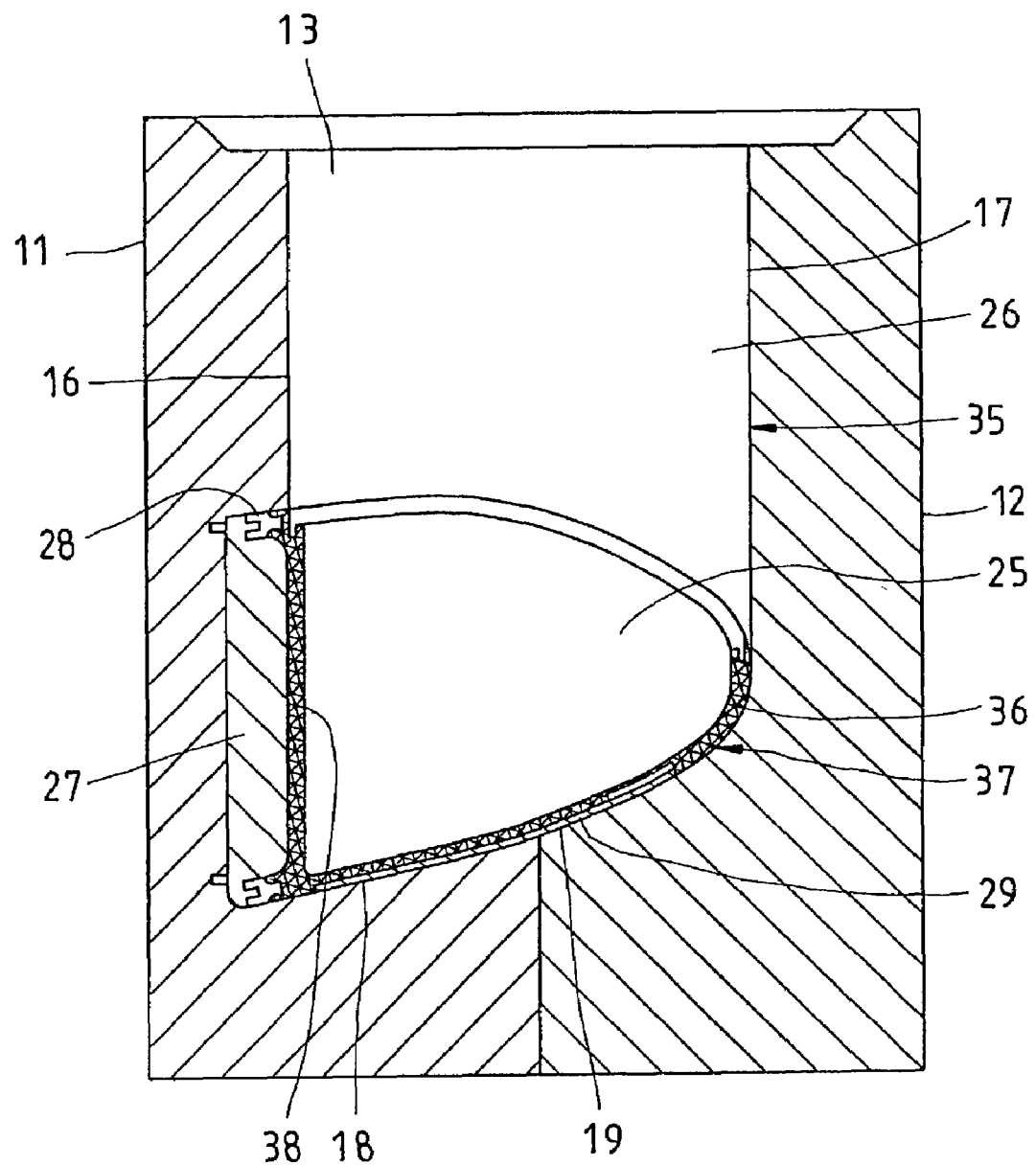
FIG. 5 is a schematic view of a fifth step of the method of the first preferred embodiment of the present invention.

FIG. 3 shows a wood golf club head 80 made from a method of the third preferred embodiment. The golf club head 80 has a main body 81 that is made from the method as same as the method described above. A top casing 82 is fixed to a main casing 83 covering a top opening 84 thereof. The main casing 83 has a front opening 85 that is formed by cutting the front wall of the main casing 83, i.e. the front wall 42 of the first preferred embodiment. A front casing 86, having a board portion 87 and an annular wall 88, is fixed to the main casing 83 covering the front opening 85 to form the golf club head 80. The golf club head 80 has less weight and different sound when swinging. The thickness of the board portion 87 of the front casing 86 is thicker at the center region thereof and thinner at the peripheral region thereof such that an annular bending portion is formed at the boundary of the board portion 87 and annular wall 88. The board portion 87 will has well spring-like effect.

What is claimed is:

1. A method of manufacturing a composite wood golf club head with a metal face, comprising the steps of:

(a) arranging a first die, a second die and a mold plunger;

wherein said first die and said second die can be driven to combine and to separate;

wherein said first die has a first cavity having a recessed portion and a slot portion extending inwardly from a topside thereof to the recessed portion;

wherein said second die has a second cavity having a recessed portion and a slot portion extending from a topside thereof to the recessed portion of the second die, and the recessed portions and the slot portions of the first and second cavities are combined with each other when said first die and said second die are combined;

wherein said mold plunger is located above the dies and can be driven to move downwards and upwards, said mold plunger has a mold portion at the bottom thereof and a plunger portion at the top thereof;

(b) combining said first die and said second die such that a mold cavity is defined by the first and second cavities;

wherein said mold cavity has a convex wall at a side wall thereof substantially corresponding in shape to the face of the golf club head to be made, and an annular flange around said convex wall;

wherein the bottom side of the mold cavity is mounted with a metal bottom board;

(c) putting a bulk molding compound (B.M.C.) into the mold cavity;

(d) moving said mold plunger into said mold cavity through said slot portions to compress the B.M.C until the slot portions are sealed by the plunger portion of said mold plunger such that a mold space, including a platelike portion left between the convex wall and the mold portion of the mold plunger, is defined in between the recessed portions of said first and second cavities and the mold portion of said mold plunger for being filled with said bulk molding compound, wherein the B.M.C covers said bottom board;

(e) solidifying said compressed bulk molding compound, and then separating said first die, said second die and said mold plunger to get a composite main body of the golf club head, wherein said main body has a main casing, which has a front wall corresponding in shape to the platelike portion of the mold space, an annular recess corresponding in shape to said annular flange and a top opening at a top side thereof, and said bottom board is embedded in a bottom of said main casing and exposes its exterior surface outside; and (f) fixing a front casing and a top casing to said main casing, wherein said top casing is fixed to said main casing to cover said top opening and said front casing is made of metal having a board portion and an annular wall extending backwards from the periphery of the board portion and provided with an engaging portion at the distal end thereof for engagement with said annular recess of said main casing to fix said front casing to said main casing.

2. The method as defined in claim 1, wherein arrange a metal annular frame with a shape corresponding to said annular flange of said mold cavity and having an annular slot thereon for engagement with said annular flange to detachably install said annular frame on said convex wall of said mold cavity before the step (c), and said annular frame is embedded in the peripheral of the front side of said main casing in the step (e) and said annular frame engages said annular slot with said engaging portion of said front casing in the step (f).

3. The method as defined in claim 2, wherein one of said dies is provided at the recessed portion thereof with a core socket for detachable engagement with a core, wherein said core has said convex wall and said annular flange at exterior side thereof, and said annular frame is engaged with said core at the exterior side thereof.

4. The method as defined in claim 1, wherein one of said dies is provided at the recessed portion thereof with a core socket for detachable engagement with a core, wherein said core has said convex wall and said annular flange at exterior side thereof.

5. The method as defined in claim 4, further comprising removing said front wall of said main casing to form a front opening before fixing said front casing to said main casing in the step (f).

6. The method as defined in claim 1, wherein said front casing has an annular recess at the back side of the periphery of the board portion.

7. The method as defined in claim 1, wherein the thickness of said board portion of said front casing is thicker at the center region thereof and is thinner at the peripheral region thereof.

8. The method as defined in claim 1, wherein a weight device is mounted to said bottom board in the step (b) and said weight device is embedded on the bottom side wall of said main casing and closes to the rear side of the main casing.

9. The method as defined in claim 1, wherein said top casing is made of composite material.

10. The method as defined in claim 1, wherein said main body has a neck integrally formed on the main casing.

* * * * *